United States Patent [19]

Swanson et al.

[11] Patent Number: 5,317,989

[45] Date of Patent: Jun. 7, 1994

[54] ADJUSTABLE ANIMAL COLLAR AND LEASH

[75] Inventors: Kari Swanson, Aurora; Janet Nash, Sugar Grove, both of Ill.

[73] Assignee: Midwest Greyhound, Partnership, Sugar Grove, Ill.

[21] Appl. No.: 36,506

[22] Filed: Mar. 24, 1993

[51] Int. Cl.⁵ ............................................. A01K 27/00
[52] U.S. Cl. .................................... 119/792; 119/864; 119/793
[58] Field of Search ................................ 119/106, 109

[56] References Cited

U.S. PATENT DOCUMENTS

| | | | |
|---|---|---|---|
| 770,070 | 9/1904 | Johnson | 119/106 |
| 2,458,489 | 1/1949 | Hallander | 119/109 |
| 2,614,533 | 10/1952 | Elsinger | 119/106 |
| 4,841,915 | 6/1989 | Rocchetti | 119/106 |
| 4,924,815 | 5/1990 | Halla | 119/106 |

FOREIGN PATENT DOCUMENTS

| | | | |
|---|---|---|---|
| 286728 | 10/1988 | European Pat. Off. | 119/106 |
| 7704665 | 11/1977 | Netherlands | 119/106 |
| 819270 | 9/1959 | United Kingdom | 119/109 |

*Primary Examiner*—Gene Mancene
*Assistant Examiner*—Todd E. Manahan
*Attorney, Agent, or Firm*—Donald H. Fidler

[57] ABSTRACT

An animal collar particularly adapted for dogs includes a wide flexible collar member attached to "D" rings and a flexible strap member looped through the "D" rings to provide an adjustable collar opening and a separate and apart location for a resilient gripping member. The gripping member is slidable on the strap member for adjusting the size of the collar opening.

8 Claims, 1 Drawing Sheet

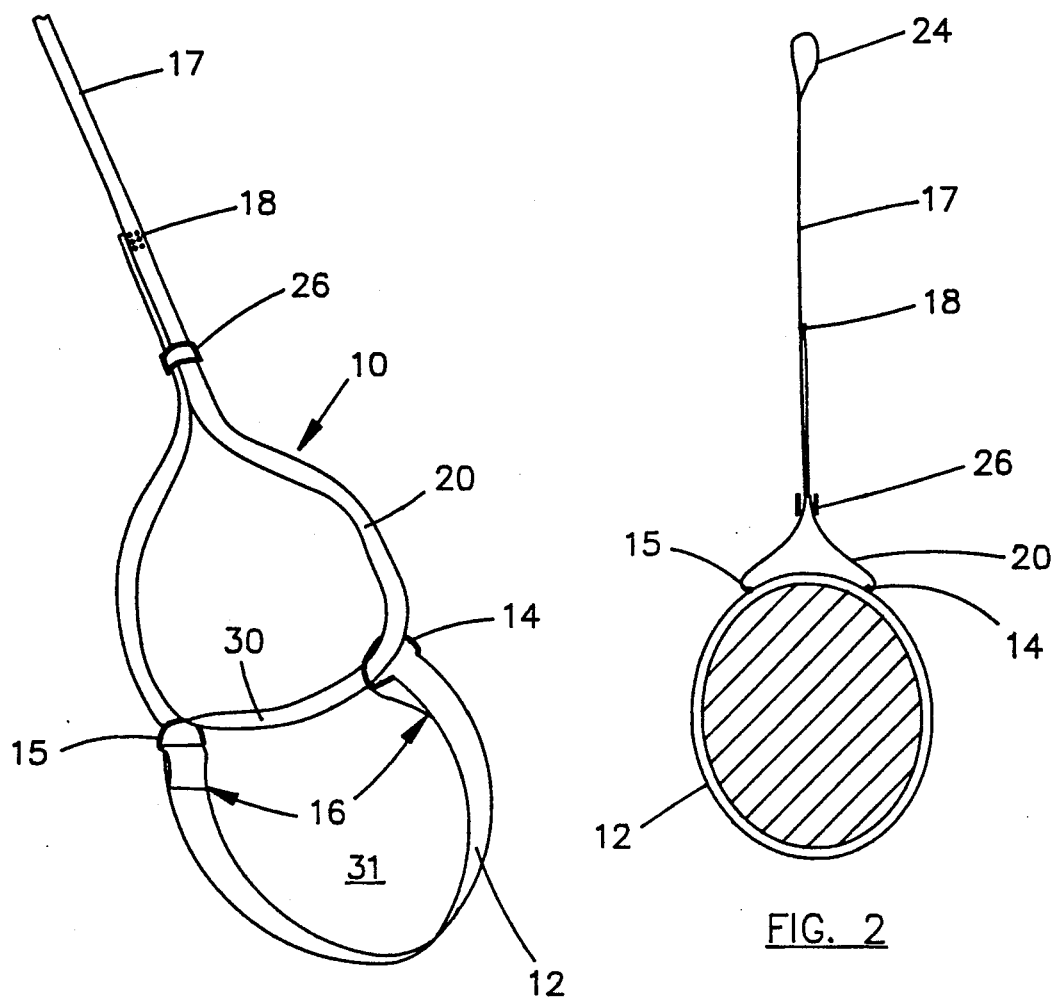
FIG. 1
FIG. 2
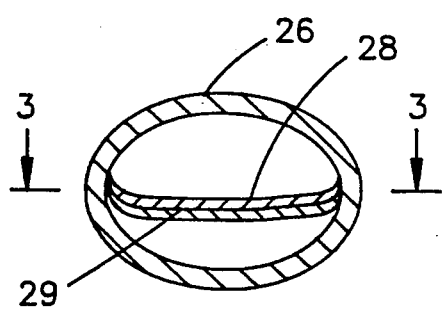
FIG. 4
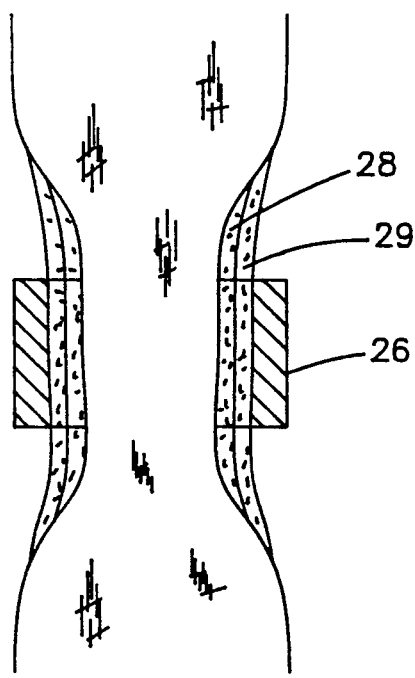
FIG. 3

ADJUSTABLE ANIMAL COLLAR AND LEASH

FIELD OF THE INVENTION

This invention relates to animal leashes and more particularly to a form of choke collar and leash for an animal where the collar is adjustable to accommodate different neck sizes and provides for balanced choke force when actuated.

BACKGROUND OF THE INVENTION

Animal collars come in a variety of forms. Any number of collars use metal buckles to adjust to an animals neck size. Choke collars for animals commonly employ chain links as a flexible neck encircling member where the chain passes through a ring at one end of the chain links and permits a pull on the other end of the chain to develop a choking action on the animals neck for control purposes. Chain links are typically loose fitting and the weight of the chain tends to drop the ring to the under side of the neck if the chain is not kept under a pull or strain at all times. Additionally, it is necessary to maintain the chain or leash on one side of the ring so that when the chain is pulled it can produce the choking effect. Chain links can unnecessarily injure an animal.

Metal buckles of various kinds are utilized to adjust a collar to a given neck size for an animal and are held in position or to a given neck size by friction loops, tongue members or clamps of different varieties. Metal attaching devices are capable of scratching or gouging upon contact, are bulky and awkward to store when not in use.

PRIOR PATENT ART

U.S. Pat. No. 4,841,915 issued to F. Rocchetti on Jun. 27, 1989 discloses an adjustable collar with two straps and three buckles. One strap is attached to the lower ends of the side buckles and the other strap is attached to the side buckles but wound in a circular manner and form a double loop at the upper buckle. The straps are said to slide relative to one another and to the side buckles to apply and to release tension on the collar.

U.S. Pat. No. 5,005,027 issued to Charles Hatfield on Apr. 9, 1991 discloses a one piece leash where one end of the leash is attached to a clamp member which is spaced from a "D" ring. The leash loops back and through the "D" ring and through the clamping member to the handle loop end of the leash. The leash is adjustable by sliding the web relative to the clamp and "D" ring.

U.S. Pat. No. 5,031,576 issued to Robert Weinberg on Jul. 16, 1991 discloses an adjustable strap with a buckle at one end and a connector at the other end. The connector is attachable to the collar at a variety of locations.

U.S. Pat. No. 3,995,598 issued to Elston Gardner on Dec. 7, 1976 discloses a chain type choke collar with a breakable link to the tether.

U.S. Pat. No. 4,321,891 issued to Romane G. Moelier on Mar. 30, 1982 discloses an adjustable animal collar form from a continuous strap. One end of the strap attaches to a first ring and has a snap ring for attachment of a leash. The strap passes through a buckle and is looped through the first ring and attached to the buckle. By shifting the buckle relative to the strap the neck size can be changed as desired.

U.S. Pat. No. 4,996,948 issued to Valerie Klein on Mar. 5, 1991 disclose a choke collar where an additional chain link is added to the underside of the collar so the choke ring tends to stay at the top of the neck of an animal.

German patent No DE 3925-548 A discloses an animal collar which has a snap lock or clasp and a loop arrangement which is steplessly adjustable.

Swiss patent No. 197,721 discloses an adjustable collar which has chains for adjustment purposes.

SUMMARY OF THE INVENTION

In the present invention, an animal leash is constructed preferably from a flexible, light weight flat webbing material such as nylon or polystyrene. A first collar strap member has its ends attached to "D" rings. The attachment is by virtue of each end of the strap respectively passing through a ring and being sewed to the strap thereby to attach a ring to the strap member. A second leash strap member has one end which passes through each of the "D" rings and is attached to an intermediate section of the strap by sewing thereby to form a control loop which connects to the "D" rings on the first collar strap member. The other end of the lease strap member is folded and sewed to form a loop handle. The portions of the leash strap member forming the control loop are received within a tubular flexible frictional gripping member. The gripping member has a diameter sized so that when the gripping member is located on side by side strap portions of the control loop, the gripping member assumes an oval shape and the edges of the strap members are curled to conform to the oval curvature of the gripping member.

In use, the gripping member is slid along the side by side straps toward the loop handle end of the second strap member to permit the "D" rings on the first strap to move away from one another so that the first strap member and the portion of the second strap member between the "D" rings define an adjustable collar opening. The collar opening can be enlarged to somewhat less than one-half of the length of the control loop. The length of the control loop is made much larger than required for actual use so that when the collar opening fits over the animals head and the gripping member is moved toward the collar opening the control loop snugs the "D" rings towards one another until the first strap member and a neck portion of the control loop are as snug as desired with respect to the animals neck. This permits the collar to be easily applied to an animals neck and the remaining portions of the leash strap to be equidistantly located between the "D" rings and the gripping member.

A choke action, if necessary for control is available be applying pull or tension force to the leash strap which applies an equal force to each of the "D" rings to close the collar opening on the neck of the animal. Because of the balanced arrangement of the "D" rings and the control loop, the leash can be effectively pulled from either side of an animal and apply a choke grip with a more uniform force.

DESCRIPTION OF THE DRAWINGS

In the drawings:

FIG. 1 is a perspective illustration of a leash according to the present invention;

FIG. 2 is an illustration of the leash of the present invention in plan view;

FIG. 3 is a plan view of a portion of the leash at the location of the gripping member taken along line 3—3 of FIG. 4; and FIG. 4 is a view in cross section taken along line 4—4 of FIG. 3.

DESCRIPTION OF THE INVENTION

Referring now to FIG. 1, in the present invention the animal leash 10 is constructed preferably from a flexible flat webbing material such as nylon or polystyrene. A first collar strap member 12 has its ends attached to "D" rings 14,15 where each end respectively passes through a ring 14 or 15 and an end is sewed (at 16) to the strap member 12 thereby to attach to the rings 14 and 15 to the end of the first strap member 12. A second leash strap member 17 has one end which passes through each of the "D" rings 14 and 15 and is attached to an intermediate section 18 of the strap member by sewing thereby to form a control loop 20 which connects to the first collar strap member 12. The other end 22 of the leash strap member 17 is folded and sewed to form a loop handle 24. The portions of the leash strap member 17 forming the control loop 20 are received within a tubular flexible frictional gripping member 26. The gripping member 26 has a diameter sized so that when the gripping member 26 is located on side by side strap portions 28,29 (See FIGS. 3 & 4) the gripping member 26 assumes an oval shape and the sides of the strap portions 28,29 are curled to conform to the oval curvature of the gripping member 26. The gripping member is constructed, for example from polystyrene tubing material.

In use, the gripping member 26 is slid along the side by side strap portions 28,29 toward the loop handle 24 of the second strap member 17 to permit the "D" rings 14,15 on the first strap member 12 to move away from one another. This permits the first strap member 12 and a neck portion 31 of the second strap member 17 between the "D" rings 14,15 to define an adjustable collar opening 31. The collar opening 31 can be enlarged to the extent of about one-half of the length of leash in the control loop 20. The length of the control loop 20 is made larger than required for actual use so that the collar opening 31 is adjustable to fit over the animals head and the gripping member 26 can be moved toward the collar opening 30 to adjust to the neck size of the animal. The control loop 20 and the gripping member 26 snug the "D" rings 14,15 towards one another until the first strap member 12 and the neck portion 30 of the control loop 20 are as snug as desired with respect to the animals neck. The adjustable control loop 20 permits the size of the collar opening 31 to be easily adjusted for passing over an animals head and applied to an animals neck. When the collar opening 31 is adjusted to an animals neck, the remaining portions of the leash strap are equidistantly located between the "D" rings and the gripping member 26. A choke action, if necessary for control is available be applying pull or tension force to the leash strap member 17 which applies an equal force to each of the "D" rings 14,15 to reduce the size of the collar opening 31 and apply a constricting force to the neck of the animal.

Because of the balance arrangement of the "D" rings and the control loop 20, the leash can be effectively pulled from either side of an animal and apply a choke grip or force with a more uniform application to the neck.

By way of example, a leash suitable for a 13 to 15 inch neck size can be made with a second leash member 1" wide with a length of 5 to 6 feet to the "D" rings. A suitable loop handle is 6 to 7 inches and a suitable length for a control loop 20 is 26 inches (13 inches when looped). The first leash member can be made with a double width of 2 inches and an overall length of 12 inches. The circumference of the collar opening 31 is about 31 inches when fully opened. When fully closed, the circumference of the collar opening 31 is 12 inches with the "D" rings in contact with one another. The double width material provides for a somewhat heavier and wider band which is non injurious to an animal as well as tending to permit the "D" rings to remain in an uppermost position with respect to an animals neck. The gripping member 26 may have a diameter of three-fourths of an inch and be 1 inch in length.

It will be apparent to those skilled in the art that various changes may be made in the invention without departing from the spirit and scope thereof and therefor the invention is not limited by that which is disclosed in the drawings and specification but rather as encompassed within the scope of the claims and equivalent structures.

We claim:

1. An animal collar comprising a strap member and a collar member respectively constructed from a flexible material;

said collar member having its ends attached to "D" ring, said strap member having a closed control loop defined by a continuous length of said flexible material where said loop passes through said "D" rings so that a continuous portion of said control loop between said "D" rings and said collar member define a collar opening which is adjustable in size, and a resilient gripping member slidable received on said control loop in a location separate and apart from said continuous portion for frictionally engaging adjacent side by side portions of said control loop whereby said collar opening can be adjusted for passing over an animals head and reduced in size to an animals neck and where the control loop further provides for a choke collar effect by moving said "D" rings toward one another when a control force is applied to the strap member.

2. The animal leash as set forth in claim 1 wherein the width of the webbing of the collar member is approximately twice the width of the strap member.

3. The animal leash as set forth in claim 1 wherein the length of the control loop is proportioned relative to the collar member for adjusting to various neck sizes.

4. The animal leash as set forth in claim 3 wherein the length of the control loop is approximately twice the length of the collar member.

5. An animal collar comprising a strap member and a collar member respectively constructed from a flexible material, said collar member having its ends attached to "D" rings, said strap member having a closed loop passing through said "D" rings so that a portion of said control loop together with said collar member form a collar opening which is adjustable in size, and a resilient gripping member slidably received on adjacent portions of said control loop to frictionally engage adjacent portions of said control loop whereby said collar opening can be adjusted for passing over an animals head and reduced in size to an animals neck and where the control loop further provides for a choke collar effect by moving said "D" rings toward one another when a control force is applied to the strap member; and wherein said gripping member is tubular and flexible to an oval configuration when applied to the adjacent portions of said control loop to conform the side edges of said adjacent portions to the curvature of said oval configuration.

6. The animal leash as set forth in claim 5 wherein said flexible material is constructed from webbing and wherein the width of the webbing of the collar member is wider than the width of the strap member to increase the surface area in contact with an animals neck.

7. The animal leash as set forth in claim 6 wherein the length of the control loop is proportioned relative to the collar member for adjusting to various neck sizes.

8. The animal leash as set forth in claim 7 wherein the length of the control loop is approximately twice the length of the collar member.

* * * * *